(12) United States Patent
Fisher et al.

(10) Patent No.: US 11,315,107 B2
(45) Date of Patent: Apr. 26, 2022

(54) AUTOMATED PURCHASE CARD DISABLE SYSTEM AND METHOD

(71) Applicant: JPMorgan Chase Bank, N.A., New York, NY (US)

(72) Inventors: Nicholas Fisher, Middletown, DE (US); Dipak K. Mukhopadhyay, Bear, DE (US); Howard Abramowitz, Philadelphia, PA (US); Gabriella M. Tolotta, Garnet Valley, PA (US); Priyanka Malkoti, Wilmington, DE (US); Noor Shadid, Wilmington, DE (US); Edward Zlatsen, Wilmington, DE (US); James P. White, III, Middletown, DE (US); John L. Oliver, III, Smyrna, DE (US); Eric Han Kai Chang, Wilmington, DE (US); Sudheer K. Vankadara, Newark, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 106 days.

(21) Appl. No.: 16/352,449

(22) Filed: Mar. 13, 2019

(65) Prior Publication Data

US 2019/0287094 A1 Sep. 19, 2019

Related U.S. Application Data

(60) Provisional application No. 62/643,228, filed on Mar. 15, 2018.

(51) Int. Cl.
| | | |
|---|---|---|
| *G06Q 20/34* | (2012.01) | |
| *H04W 4/029* | (2018.01) | |
| *G06Q 20/40* | (2012.01) | |

(52) U.S. Cl.
CPC ........ *G06Q 20/354* (2013.01); *G06Q 20/356* (2013.01); *G06Q 20/405* (2013.01); *G06Q 20/4093* (2013.01); *H04W 4/029* (2018.02)

(58) Field of Classification Search
CPC ........ G06Q 40/00; G06Q 40/08; G06Q 20/00
See application file for complete search history.

(56) References Cited

U.S. PATENT DOCUMENTS

| | | | |
|---|---|---|---|
| 9,398,007 B1* | 7/2016 | Wegener | H04W 12/065 |
| 10,395,264 B2* | 8/2019 | Fordyce, III | G06Q 30/04 |
| 2009/0006203 A1* | 1/2009 | Fordyce, III | G06Q 30/04 |
| | | | 705/14.1 |
| 2011/0231223 A1* | 9/2011 | Winters | G06F 16/248 |
| | | | 705/7.29 |
| 2012/0123924 A1* | 5/2012 | Rose | G06Q 20/3276 |
| | | | 705/35 |

(Continued)

*Primary Examiner* — Bennett M Sigmond
*Assistant Examiner* — Xavier M. Bennett
(74) *Attorney, Agent, or Firm* — Greenblum & Bernstein, P.L.C.

(57) ABSTRACT

Systems and methods for automatically enabling and disabling a purchase card based on predetermined preferences set by a cardholder are provided. The systems and methods enable users to set preferences in advance, and then automatically determine whether to accept or decline a transaction based on the preset preferences. The systems and methods may also implement a learning algorithm to develop preferences based on historical cardholder behavior.

22 Claims, 12 Drawing Sheets

(56) References Cited

U.S. PATENT DOCUMENTS

| | | | | |
|---|---|---|---|---|
| 2012/0310760 A1* | 12/2012 | Phillips | ............... | G06Q 20/227 |
| | | | | 705/26.1 |
| 2014/0180810 A1* | 6/2014 | Boal | ................. | G06Q 30/0251 |
| | | | | 705/14.53 |
| 2015/0032543 A1* | 1/2015 | Weis | ................. | G06Q 30/0261 |
| | | | | 705/14.58 |
| 2015/0134528 A1* | 5/2015 | Fineman | ............... | G06Q 20/02 |
| | | | | 705/44 |
| 2017/0083985 A1* | 3/2017 | Lacoss-Arnold | ...... | G06Q 40/12 |
| 2017/0344991 A1* | 11/2017 | Mark | .................. | G06Q 20/425 |

\* cited by examiner

500

AUTOMATED PURCHASE CARD DISABLE SYSTEM AND METHOD

CROSS-REFERENCE TO RELATED APPLICATIONS

This application claims the benefit of U.S. Provisional Patent Application Ser. No. 62/643,228, filed Mar. 15, 2018, which is hereby incorporated by reference in its entirety.

BACKGROUND

1. Field of the Disclosure

This technology generally relates to systems for and methods of automatically enabling and disabling a purchase card for attempted transactions.

2. Background Information

Because consumers are increasingly mobile, purchase cards such as credit cards, debit cards, and preloaded stored value cards are often used for on-line purchasing. As the prevalence of purchase card fraud increases, fraud detection and invention have become critically important. Methods of automated fraud detection that rely on behavioral algorithms are known, but often result in unnecessary and unwanted transaction rejections. Such conventional methods frequently require that the cardholding consumer must notify the card issuer that they are traveling to a particular geographic region or are planning to make a relatively expensive purchase. As a result, if the consumer fails to notify the card issuer, transactions may be unnecessarily declined, thereby causing inconvenience and embarrassment to the consumer.

In view of the above, there is an unmet need for systems for and methods of automatically enabling and disabling a purchase card.

SUMMARY

The present disclosure, through one or more of its various aspects, embodiments, and/or specific features or sub-components, provides, inter alia, various systems, servers, devices, methods, media, programs, and platforms for enabling and disabling a purchase card. The various aspects, embodiments, features, and/or sub-components provide optimized processes of enabling and disabling a purchase card based on user preferences and rules derived from historical user behavior that are obtainable from a web application during execution thereof.

According to an aspect of the present disclosure, a method for automatically determining whether to disable a purchase card is provided. The method is implemented by a web application that is executed by a processor. The method includes: receiving, by the processor via the web application and from a user, user input that includes at least one first entry that relates to a criterion for permitting a transaction without further consideration and at least one second entry that relates to a preference for declining a transaction; accessing, from a memory, historical transaction information that relates to at least one transaction that has previously been completed; generating, by the processor, at least one history-based rule based on the accessed historical transaction information; receiving, by the processor via the web application, information that relates to a proposed transaction; determining, by the processor, whether to recommend a preauthorization for the proposed transaction or to recommend a declination of the preauthorization, based on the at least one first entry, the at least one second entry, the at least one history-based rule, and the information that relates to the proposed transaction; and displaying, on a display of the mobile communication device, a recommendation message based on a result of the determining.

The at least one criterion for permitting a transaction without further consideration may relate to a list of permitted merchants.

The at least one history-based rule may relate to adding a merchant name that relates to the at least one previously-completed transaction to the list of permitted merchants.

The at least one history-based rule may relate to a location, a day of a week, and a time of the day at which the at least one transaction was previously completed.

The at least one second entry may relate to a spending limitation for a proposed purchase.

The at least one second entry may relate to a proposed purchase of merchandise that relates to at least one merchant category. The at least one merchant category may include at least one from among alcohol and a casino.

The at least one second entry may relate to a geographical restriction for a proposed purchase.

The at least one second entry may relate to a listing of disfavored merchants.

The method may further include: displaying, on the display of the mobile communication device, a multi-factor authentication selection user interface that includes a plurality of selectable authentication types; and receiving, from the user, at least one selection from among the plurality of authentication types. When a proposed transaction is initiated, the method may further include performing an authentication of the user based on the received at least one selection.

The method may further include displaying, on the display of the mobile communication device, a user prompt that relates to whether to approve or decline the transaction.

According to another aspect of the present disclosure, a portable device configured to implement an execution of a web application for automatically determining whether to disable a purchase card is provided. The portable device includes a display screen, a processor, a memory, and a communication interface coupled to each of the processor, the memory, and the display screen. When the web application is being executed, the processor is configured to: receive, from a user via the communication interface, user input that includes at least one first entry that relates to a criterion for permitting a transaction without further consideration and at least one second entry that relates to a preference for declining a transaction; access, from the memory, historical transaction information that relates to at least one transaction that has previously been completed; generate at least one history-based rule based on the accessed historical transaction information; receive, via the communication interface, information that relates to a proposed transaction; determine whether to recommend a preauthorization for the proposed transaction or to recommend a declination of the preauthorization, based on the at least one first entry, the at least one second entry, the at least one history-based rule, and the information that relates to the proposed transaction; and display, on the display screen, a recommendation message based on a result of the determining.

The at least one criterion for permitting a transaction without further consideration may relate to a list of permitted merchants.

The at least one history-based rule may relate to adding a merchant name that relates to the at least one previously-completed transaction to the list of permitted merchants.

The at least one history-based rule may relate to a location, a day of a week, and a time of the day at which the at least one transaction was previously completed.

The at least one second entry may relate to a spending limitation for a proposed purchase.

The at least one second entry may relate to a proposed purchase of merchandise that relates to at least one merchant category. The at least one merchant category may include at least one from among alcohol and a casino.

The at least one second entry may relate to a geographical restriction for a proposed purchase.

The at least one second entry may relate to a listing of disfavored merchants.

The processor may be further configured to: display, on the display screen, a multi-factor authentication selection user interface that includes a plurality of selectable authentication types; and receive, from the user, at least one selection from among the plurality of authentication types. When a proposed transaction is initiated, the processor may be further configured to perform an authentication of the user based on the received at least one selection.

The processor may be further configured to display, on the display screen, a user prompt that relates to whether to approve or decline the transaction.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
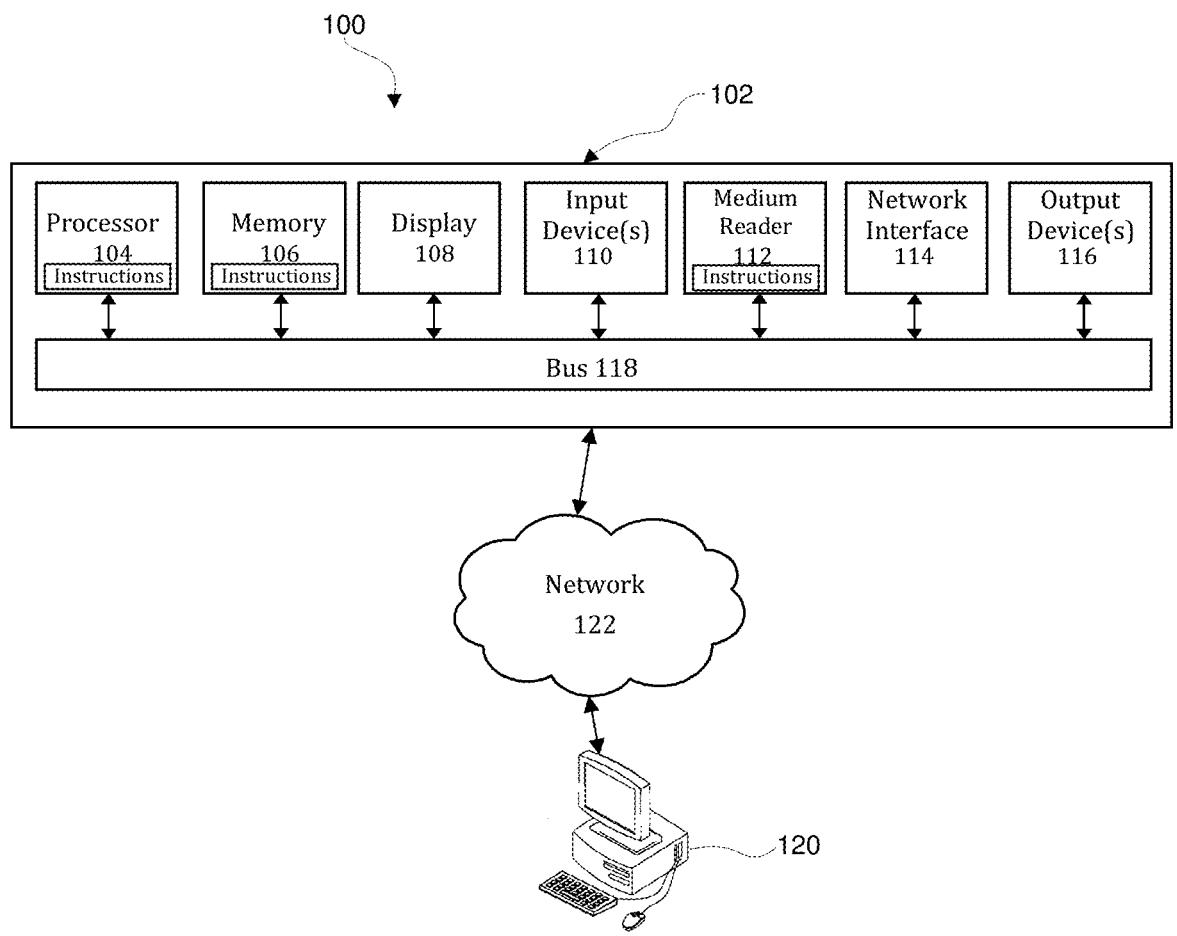
FIG. 1 illustrates an exemplary computer system for automatically enabling and disabling a purchase card for attempted transactions via an execution of a web application.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth (i.e., wireless technology standard for exchanging data over short distances), Zigbee (i.e., IEEE 802.15.4-based protocols for creating personal area networks), infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of using a web application to automatically enable and disable a purchase card for attempted transactions.

Figure 2:
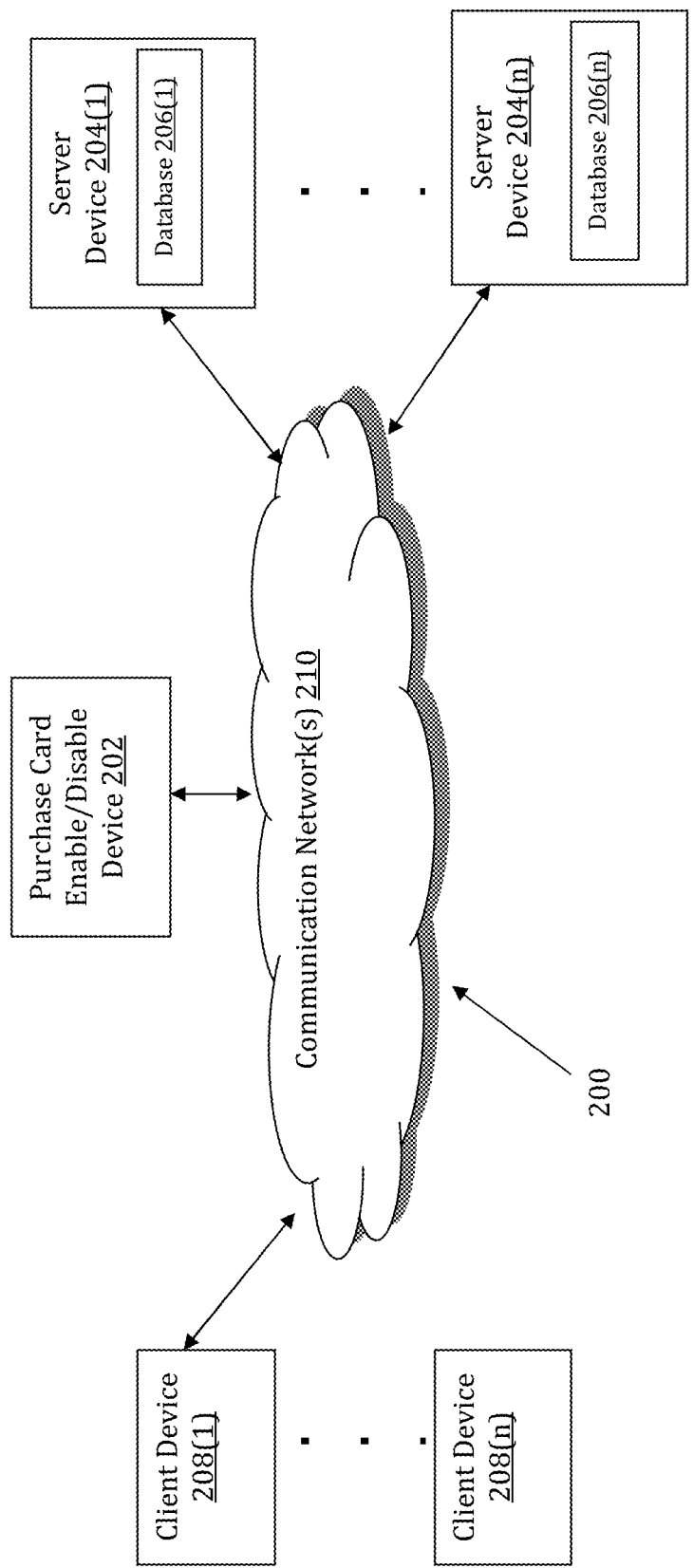
FIG. 2 illustrates an exemplary diagram of a network environment.

Referring to FIG. 2, a schematic of an exemplary network environment 200 for implementing a method for automatically enabling and disabling a purchase card for attempted transactions is illustrated. In an exemplary embodiment, the method is implemented in a web application that is executable on any networked computer platform, such as, for example, a wireless mobile communication device, i.e., a smart phone.

The conducting of the commercial transaction involving a gratuity may be implemented by a Purchase Card Enable/Disable (PCED) device 202. The PCED device 202 may be the same or similar to the computer system 102 as described with respect to FIG. 1. The PCED device 202 may store one or more applications that can include executable instructions that, when executed by the PCED device 202, cause the PCED device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PCED device 202 itself, may be located in virtual server(s) running in a cloud-based computing environment rather than being tied to one or more specific physical network computing devices. Also, the application(s) may be running in one or more virtual machines (VMs) executing on the PCED device 202. Additionally, in one or more embodiments of this technology, virtual machine(s) running on the PCED device 202 may be managed or supervised by a hypervisor.

In the network environment 200 of FIG. 2, the PCED device 202 is coupled to a plurality of server devices 204(1)-204(n) that hosts a plurality of databases 206(1)-206(n), and also to a plurality of client devices 208(1)-208(n) via communication network(s) 210. A communication interface of the PCED device 202, such as the network interface 114 of the computer system 102 of FIG. 1, operatively couples and communicates between the PCED device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PCED device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and PCED devices that efficiently automatically enable and disable a purchase card for attempted transactions.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PCED device 202 may be a standalone device or integrated with one or more other devices or apparatuses, such as one or more of the server devices 204(1)-204(n), for example. In one particular example, the PCED device 202 may include or be hosted by one of the server devices 204(1)-204(n), and other arrangements are also possible. Moreover, one or more of the devices of the PCED device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204

(n) may include, among other features, one or more processors, a memory, and a communication interface, which are coupled together by a bus or other communication link, although other numbers and/or types of network devices may be used. The server devices 204(1)-204(n) in this example may process requests received from the PCED device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store user preference data, historical user behavior data, merchant-related data, and rules that relate to the web application.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a web application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the PCED device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PCED device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PCED device 202, the server devices 204(1)-204(n), or the client devices 208(1)-208(n), for example, may be configured to operate as virtual instances on the same physical machine. In other words, one or more of the PCED device 202, the server devices 204(1)-204(n), or the client devices 208(1)-208(n) may operate on the same physical device rather than as separate devices communicating through communication network(s) 210. Additionally, there may be more or fewer PCED devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
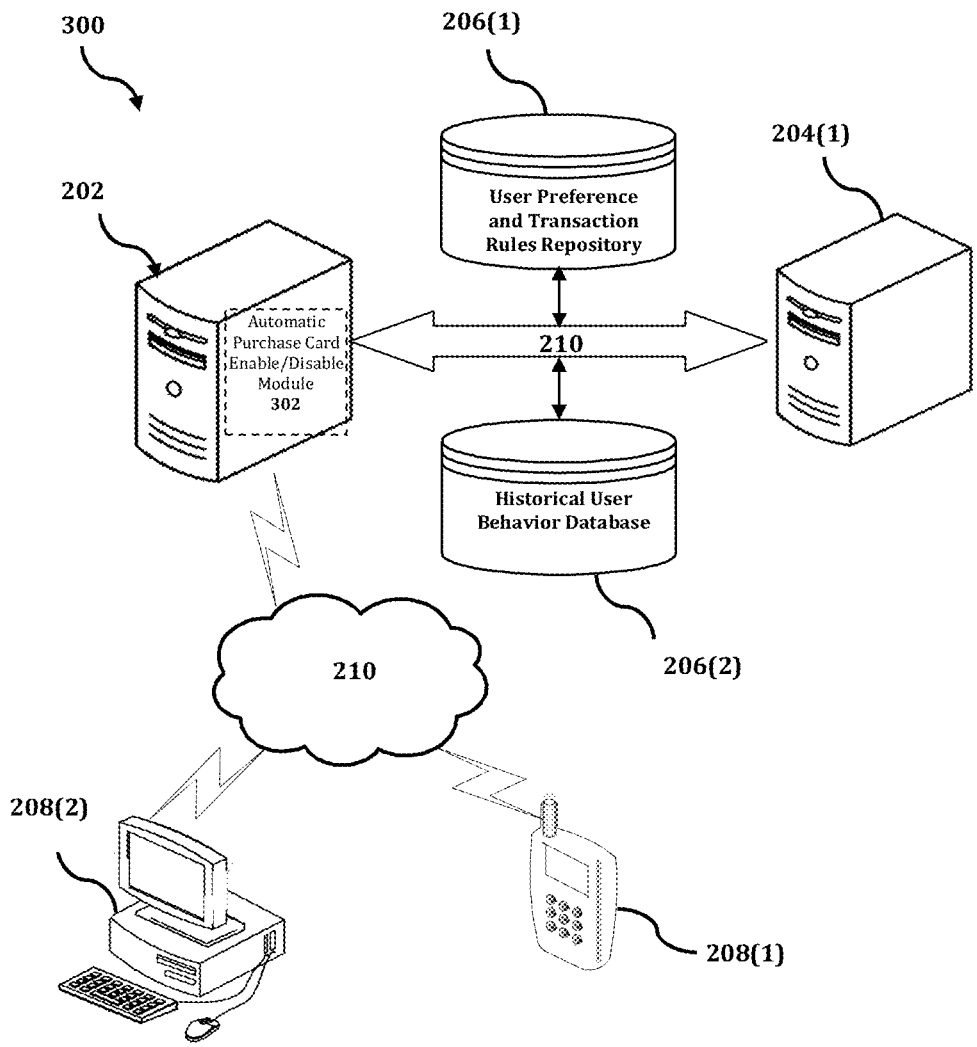
FIG. 3 shows an exemplary system for automatically enabling and disabling a purchase card for attempted transactions via an execution of a web application.

The PCED device 202 is described and shown in FIG. 3 as including an automatic purchase card enable/disable module 302, although it may include other rules, policies, modules, databases, or applications, for example. As will be described below, the automatic purchase card enable/disable module 302 is configured to automatically determine whether to enable or disable a purchase card with respect to a proposed transaction in an automated, efficient, scalable, and reliable manner. Based on information obtained via the web application, the automatic purchase card enable/disable module 302 receives information that relates to preferences and criteria for permitting or declining a transaction, as well as historical user behavior data, and then uses this information to automatically determine whether to recommend preauthorizing or declining the transaction.

An exemplary process 300 for automatically enabling and disabling a purchase card for attempted transactions by utilizing the network environment of FIG. 2 is shown as being executed in FIG. 3. Specifically, a first client device 208(1) and a second client device 208(2) are illustrated as being in communication with PCED device 202. In this regard, the first client device 208(1) and the second client device 208(2) may be "clients" of the PCED device 202 and are described herein as such. Nevertheless, it is to be known and understood that the first client device 208(1) and/or the second client device 208(2) need not necessarily be "clients" of the PCED device 202, or any entity described in association therewith herein. Any additional or alternative relationship may exist between either or both of the first client device 208(1) and the second client device 208(2) and the PCED device 202, or no relationship may exist.

Further, PCED device 202 is illustrated as being able to access a user preference and transaction rules repository 206(1) and a historical user behavior database 206(2). The automatic purchase card enable/disable module 302 may be configured to access these databases for implementing a process for automatically enabling and disabling a purchase card for attempted transactions.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the PCED device 202 via broadband or cellular communication. Of course, these embodiments are merely exemplary and are not limiting or exhaustive.

Upon being started, the automatic purchase card enable/disable module 302 executes a process for automatically enabling and disabling a purchase card for attempted transactions. An exemplary process for using a smart phone on which a web application to automatically enable and disable a purchase card for attempted transactions has been downloaded is generally indicated at flowchart 400 in FIG. 4.

Figure 4:
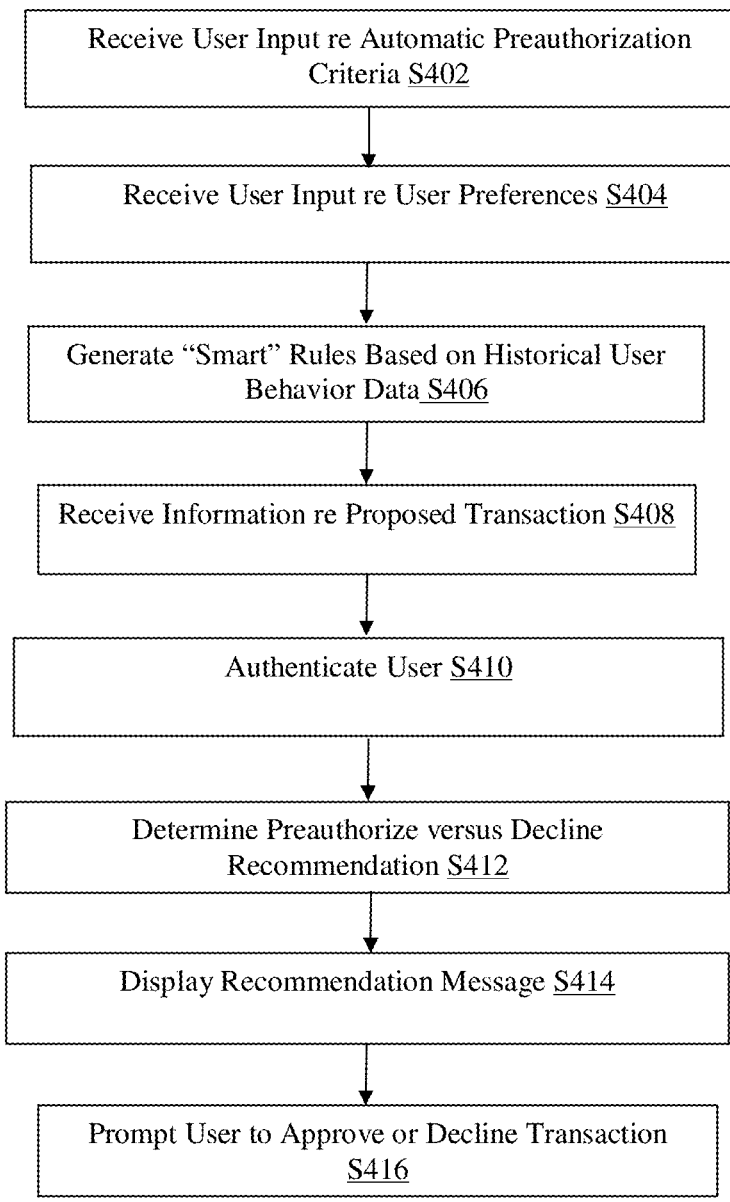
FIG. 4 is a flowchart of an exemplary process for automatically enabling and disabling a purchase card for attempted transactions via an execution of a web application.

In the process 400 of FIG. 4, while executing the web application, at step S402, a user provides inputs that indicate predetermined automatic preauthorization criteria, i.e., criteria by which a transaction would be permitted or preauthorized without further consideration. For example, the user may provide a "whitelist", i.e., a list of preapproved merchants.

At step S404, the user may enter one or more user preferences to be applied by the web application in determining whether to recommend that a transaction should be preauthorized or declined. In an exemplary embodiment, a user preference may include any one or more of a spending limitation, a geographical restriction, a restriction that relates to a merchant category or type (e.g., an alcohol merchant, a casino, a supermarket, etc.), or a "blacklist", i.e., a list of specific merchants that are disfavored.

At step S406, at least one "smart" rule is generated, based on historical user behavior data that is stored in the historical user behavior database 206(2). The data stored in the historical user behavior database 206(2) includes a record of transactions that have previously been completed by the user, together with data that relates to those transactions, such as, for example, merchant names, geographical locations, day of the week, time of day, and amount of the transaction. In an exemplary embodiment, the automatic purchase card enable/disable module 302 uses this data to identify patterns that indicate characteristics of permissible transactions, and then to generate a rule based thereon. For example, when a user frequents a particular location on a particular day of the week and spends a same approximate amount, a smart rule that indicates the location, weekday, and amount may be generated. As another example, if a user frequents a particular merchant, the name of the particular merchant may be added to a whitelist.

At step S408, information that relates to a proposed new transaction is received. In an exemplary embodiment, the web application receives information such as a merchant, a location, a time and date, and an amount of a proposed transaction.

At step S410, the user is authenticated. In an exemplary embodiment, the user may be asked to provide an input, such as a password, an answer to a security question, or a biometric input, such as a fingerprint or an input to a facial recognition module, in order to confirm that the user is a legitimate party for the proposed transaction.

At step S412, a determination is made as to whether to recommend that the proposed transaction should be preauthorized or declined. In an exemplary embodiment, the automatic purchase card enable/disable module 302 uses the user inputs, the smart rules, and the relevant transaction information to determine which recommendation is most appropriate.

At step S414, a recommendation message is displayed on the display screen of the smart phone 208. At step S416, the smart phone 208 may also display a user prompt to enable the user to indicate that the proposed transaction is accepted or declined.

The systems and methods disclosed or suggested herein may include an application 500 or "app" running on a smart phone (e.g., smart phone 208). As shown in FIGS. 5-12, according to an exemplary embodiment, the application 500 facilitates interaction by a user of the smart phone 208 and a merchant or service provider.

Figure 5:
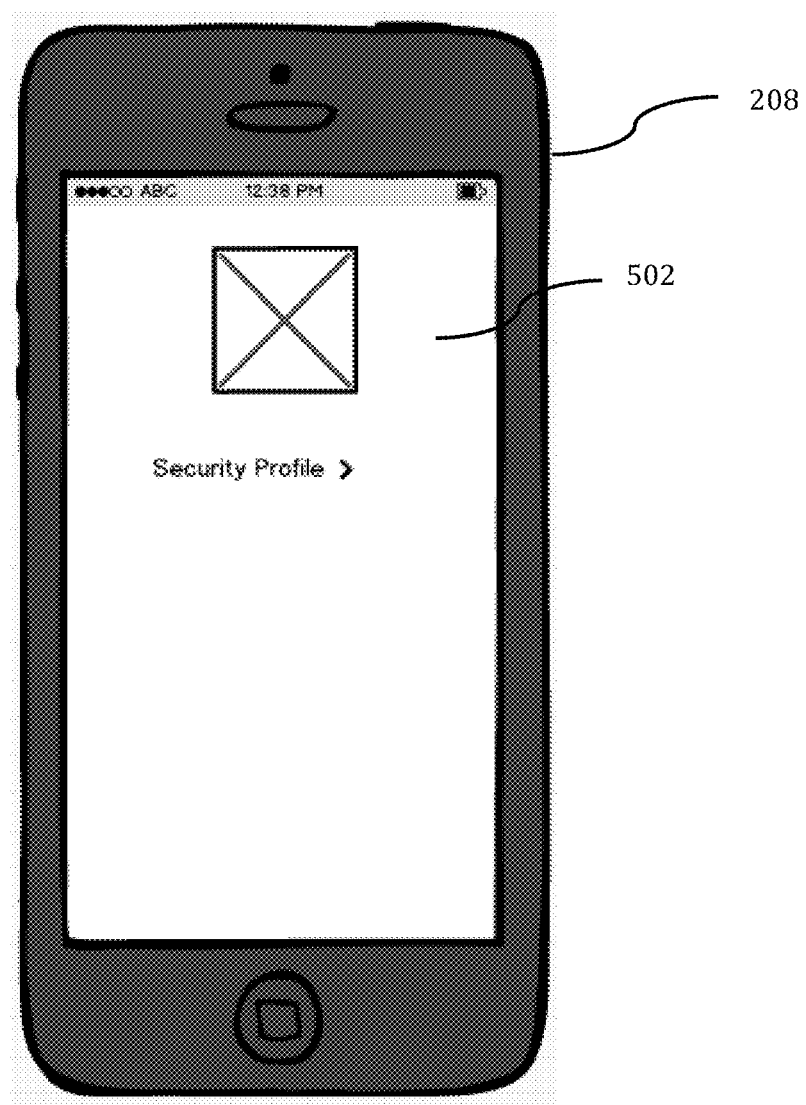
FIG. 5 illustrates a first exemplary screen shot of a display of a smart phone that is executing a web application for automatically enabling and disabling a purchase card for attempted transactions, according to an exemplary embodiment.
Figure 6:
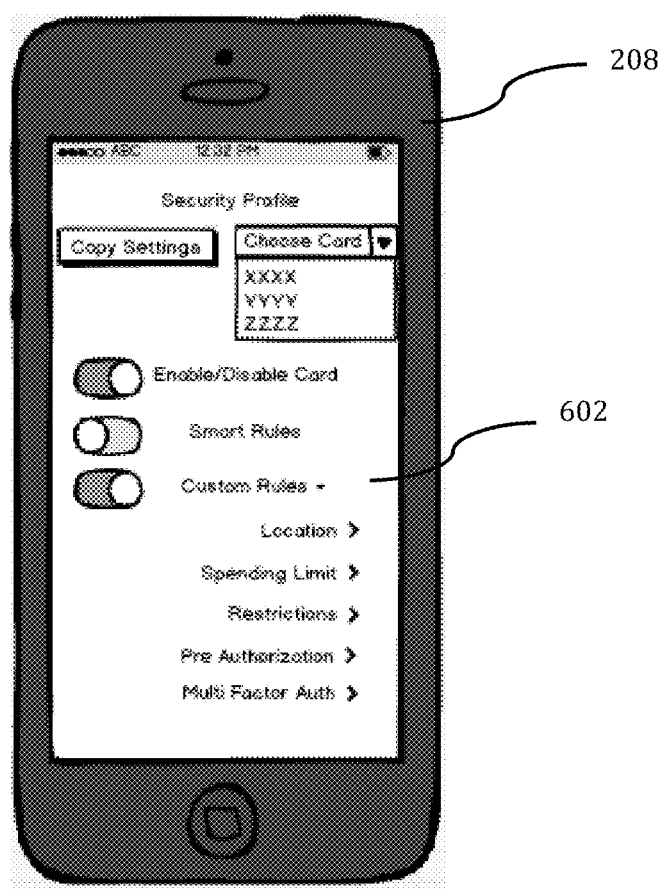
FIG. 6 illustrates a second exemplary screen shot of a display of a smart phone that is executing a web application for automatically enabling and disabling a purchase card for attempted transactions, according to an exemplary embodiment.

For example, referring to FIG. 5, in an exemplary embodiment, the application 500 provides a security profile setup screen 502. The setup screen 502 may be displayed when the application 500 is launched for the first time. The user may then select the icon shown on the setup screen 502, and then, referring to FIG. 6, a security profile user interface 602 is displayed. The security profile user interface enables a user to select a purchase card from a list; enable or disable the selected purchase card; select a smart rules enabler that relates to the selected purchase card; and enable or disable a custom rules generator for customizing transaction rules associated with the selected purchase card. Examples of custom rules include transaction location rules; spending limitation rules; restrictions; pre-authorization rules; and whether to require multi-factor authentication.

Figure 7:
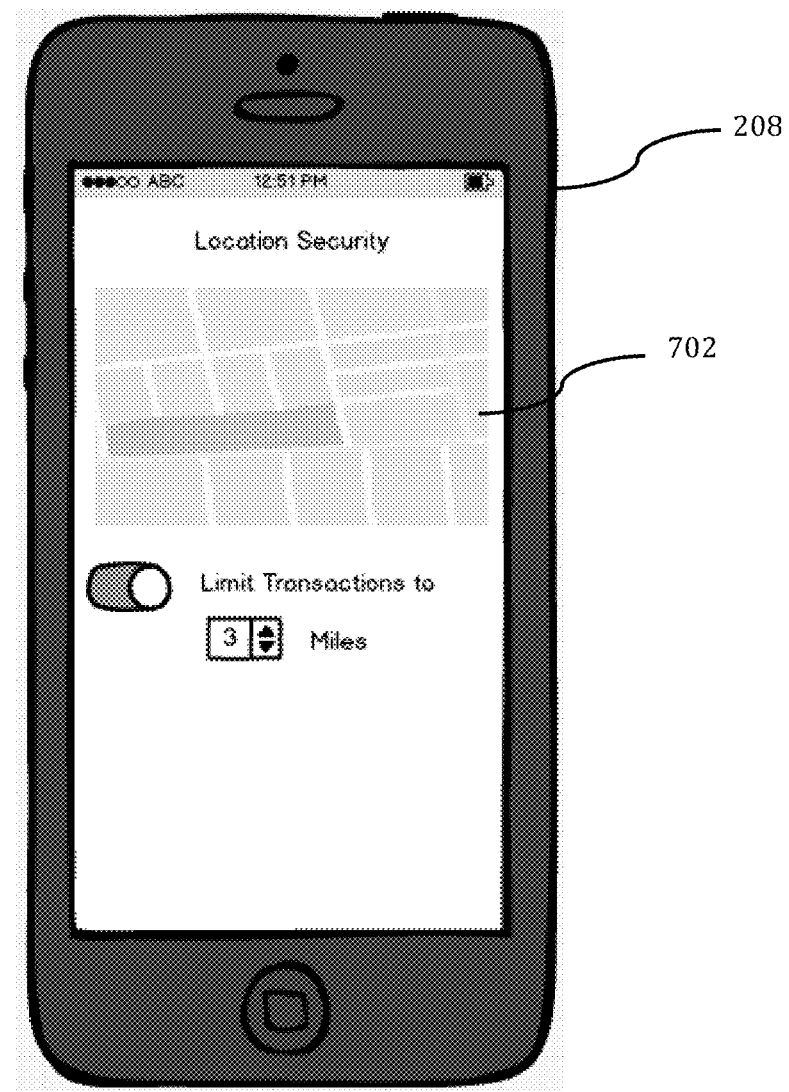
FIG. 7 illustrates a third exemplary screen shot of a display of a smart phone that is executing a web application for automatically enabling and disabling a purchase card for attempted transactions, according to an exemplary embodiment.

Referring to FIG. 7, in an exemplary embodiment, the application 500 provides a location security user interface 702 that enables the user to select a region on a map and to limit transactions to an area surrounding the selected region by using a distance selection control. Attempted purchases outside of the selected region would then cause the rule to be triggered.

Figure 8:
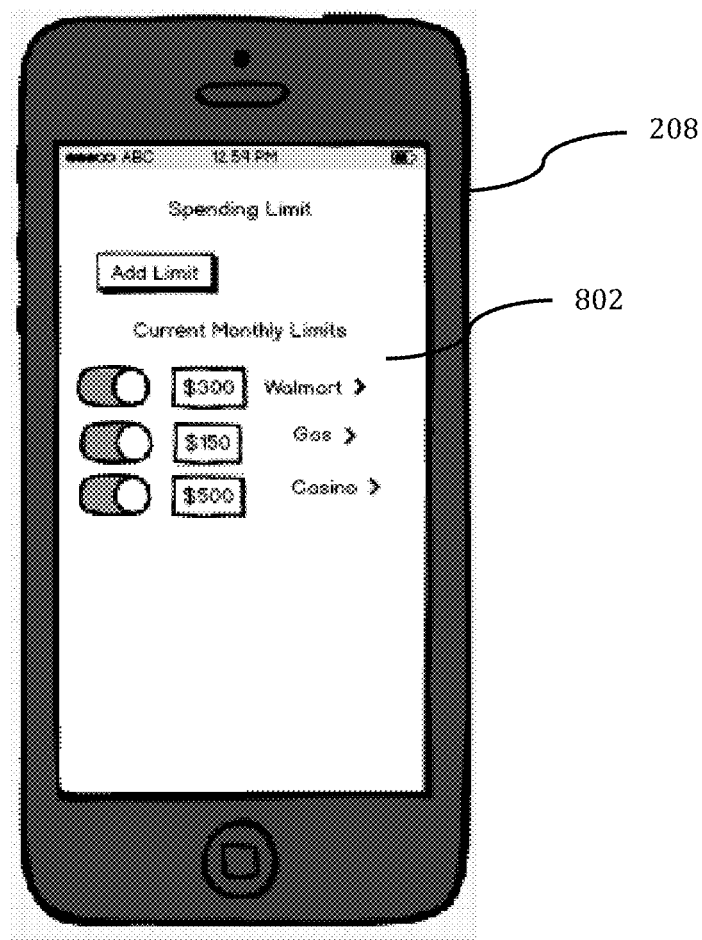
FIG. 8 illustrates a fourth exemplary screen shot of a display of a smart phone that is executing a web application for automatically enabling and disabling a purchase card for attempted transactions, according to an exemplary embodiment.

Referring to FIG. 8, in an exemplary embodiment, the application 500 provides a spending limit user interface 802 that enables the user to select a plurality of transaction amount limits. For example, each limit may include an on/off toggle selector, a limit amount, and a merchant name (e.g., Walmart) or a merchant category (e.g., gas or casino). Attempted purchases that exceed the corresponding amount limit would then cause the rule to be triggered.

Figure 9:
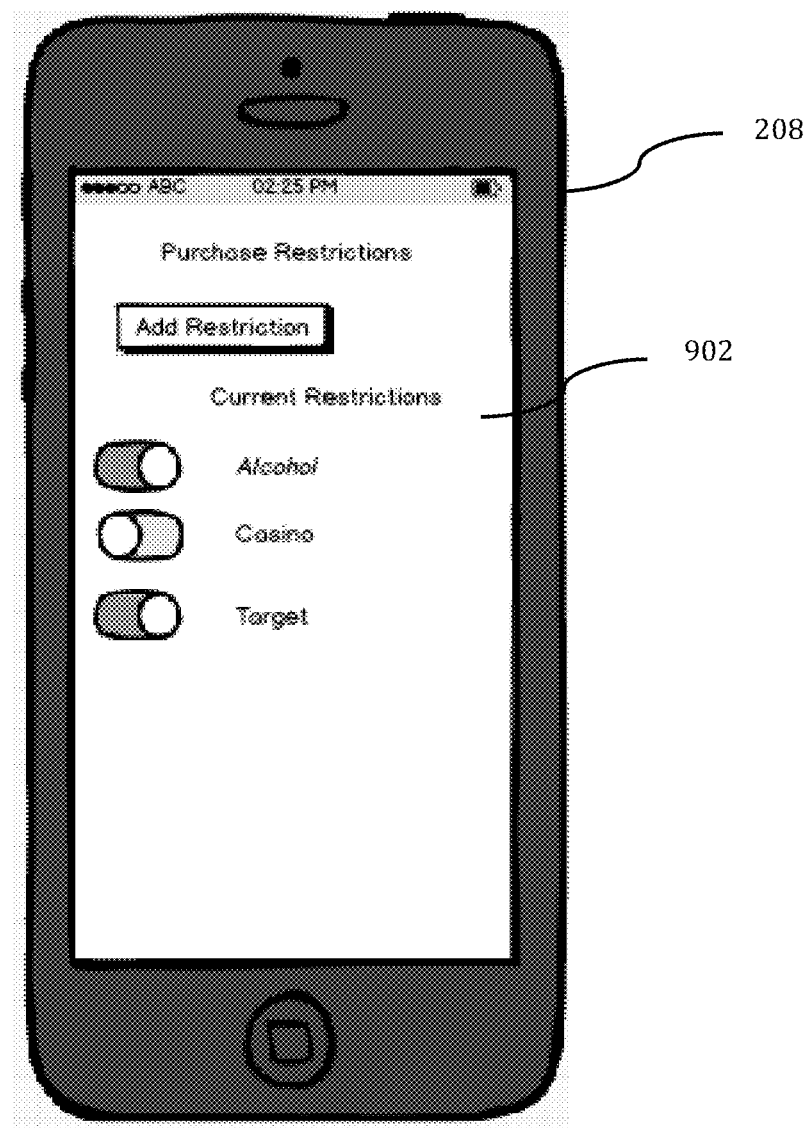
FIG. 9 illustrates a fifth exemplary screen shot of a display of a smart phone that is executing a web application for automatically enabling and disabling a purchase card for attempted transactions, according to an exemplary embodiment.

Referring to FIG. 9, in an exemplary embodiment, the application 500 provides a purchase restriction user interface 902 that enables the user to add or subtract restrictions based on merchant category (e.g., alcohol or casino) or merchant name (e.g., Target). Attempted purchases that correspond to the relevant merchant type or merchant name would then cause the rule to be triggered.

Figure 10:
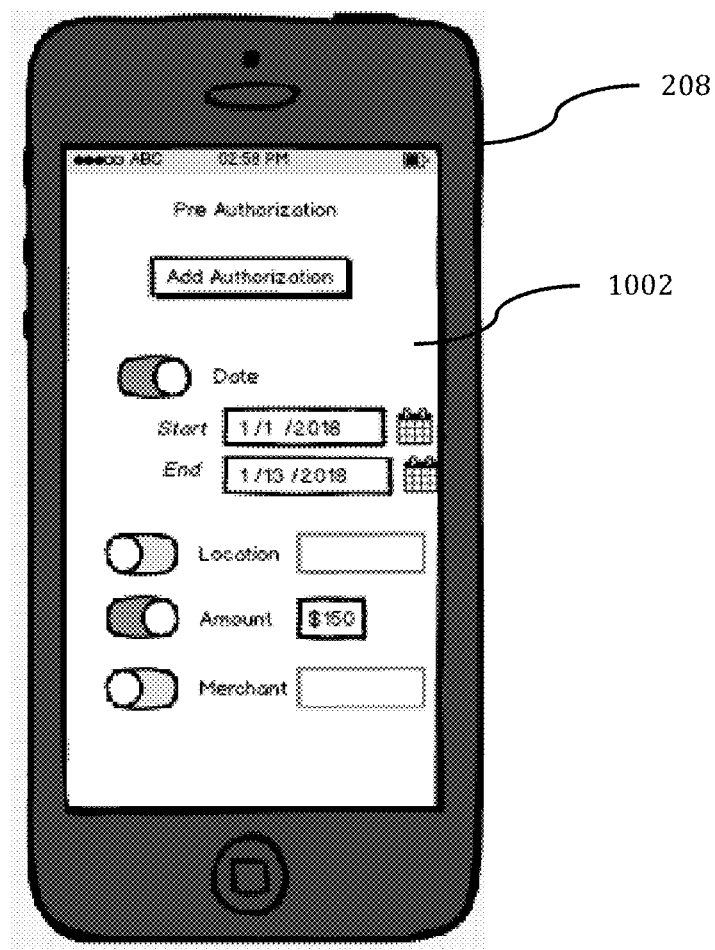
FIG. 10 illustrates a sixth exemplary screen shot of a display of a smart phone that is executing a web application for automatically enabling and disabling a purchase card for attempted transactions, according to an exemplary embodiment.

Referring to FIG. 10, in an exemplary embodiment, the application 500 provides a preauthorization user interface 1002 that enables the user to add a preauthorization that is selected from a plurality of combinable limitations. For example, a user may preauthorize transactions on a specific date by using a date control. The preauthorization user interface 1002 also includes a location control, an amount control, and a merchant name control. Accordingly, a user may preauthorize a transaction based on any or all of these controls.

Figure 11:
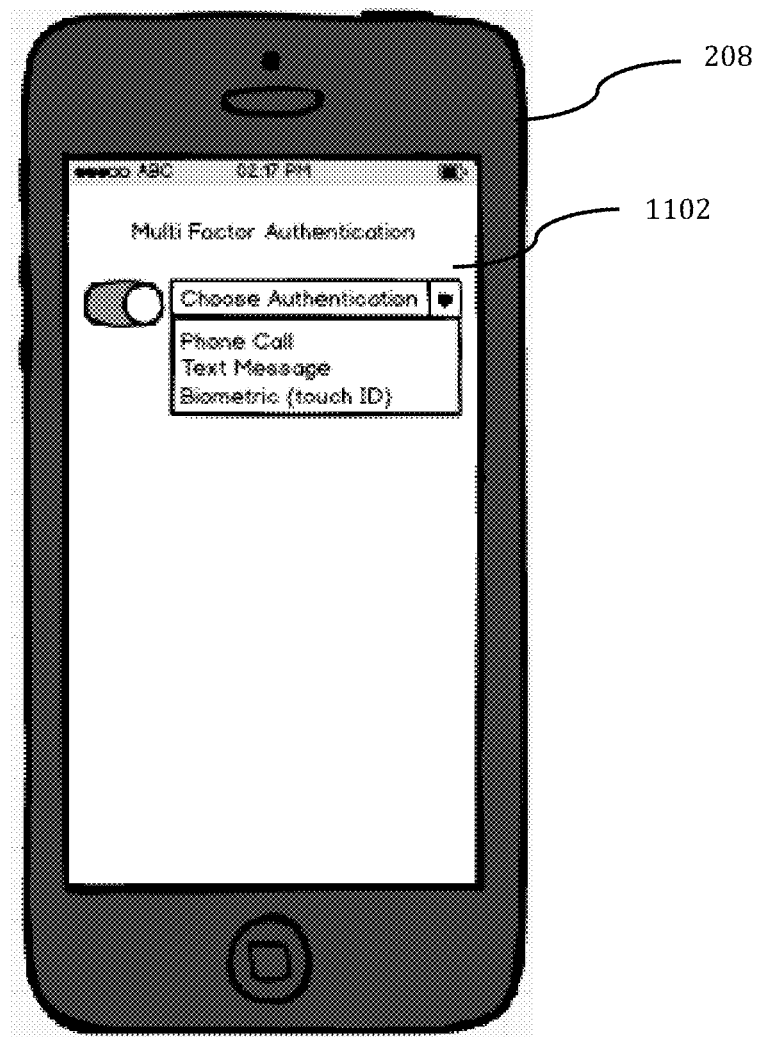
FIG. 11 illustrates a seventh exemplary screen shot of a display of a smart phone that is executing a web application for automatically enabling and disabling a purchase card for attempted transactions, according to an exemplary embodiment.

Referring to FIG. 11, in an exemplary embodiment, the application 500 provides a multi-factor authentication selection user interface 1102 that enables the user to select a second authentication method by using an enable/disable control and a selection control. The enable/disable control provides the user with a means to enable or disable multifactor authentication. The selection control provides the user with a means to select a specific type of authentication, such as, for example, a phone call, a text message, or a biometric input. Thus, if a user enables multifactor authentication, a secondary authentication action may be required in order to permit an attempted purchase card transaction to proceed.

Figure 12:
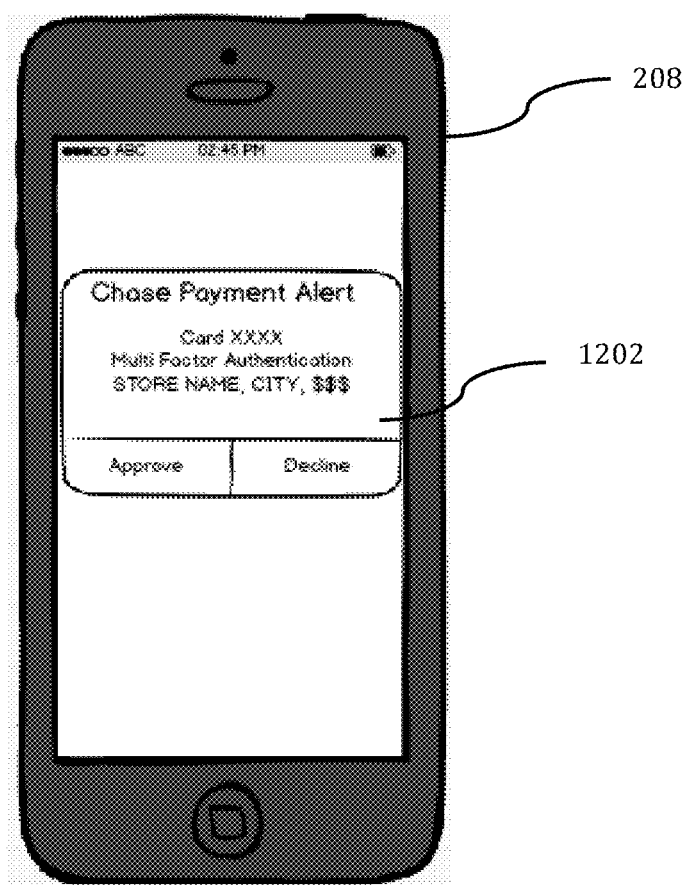
FIG. 12 illustrates an eighth exemplary screen shot of a display of a smart phone that is executing a web application for automatically enabling and disabling a purchase card for attempted transactions, according to an exemplary embodiment.

Referring to FIG. 12, in an exemplary embodiment, the application 500 provides a transaction approve/decline user interface 1202 that enables the user to approve or decline a proposed transaction. In an exemplary embodiment, the approve/decline user interface 1202 provides a notification that includes purchase card identifying information, merchant identifying information, merchant location information, and a proposed transaction amount. The approve/decline user interface 1202 also provides an approve selector and a decline selector, which enable the user to provide an input to either approve or decline the proposed transaction.

Accordingly, with this technology, an optimized process for automatically enabling and disabling a purchase card for attempted transactions is provided. The optimized process enables a user to efficiently and automatically determine a recommendation as to whether a transaction should be approved or declined based on user preferences and rules that are based on historical user behavior.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically determining whether to disable a purchase card, the method being implemented by a web application that is executed by a processor on a mobile communication device, the method comprising:
    displaying, on a display of the mobile communication device, a user interface that is generated by the web application and that includes a first prompt for facilitating a user selection of a purchase card and at least a second prompt for facilitating a user entry that relates to a rule for conducting a transaction with the selected purchase card;
    receiving, by the processor via the web application and from a user, user input that includes at least one first entry that relates to a criterion for permitting a transaction without further consideration and at least one second entry that relates to a preference for declining a transaction;
    accessing, from a memory, historical transaction information that relates to at least one transaction that has previously been completed;
    generating, by the processor, at least one history-based rule based on the accessed historical transaction information;
    receiving, by the processor via the web application after the at least one first entry and the at least one second entry have been received and after the at least one history-based rule has been generated, information that relates to a proposed transaction;
    determining, by the processor, whether to recommend a preauthorization for the proposed transaction or to recommend a declination of the preauthorization, based on the at least one first entry, the at least one second entry, the at least one history-based rule, and the information that relates to the proposed transaction; and
    displaying, on the display of the mobile communication device, a recommendation message based on a result of the determining.

2. The method of claim 1, wherein the at least one criterion for permitting a transaction without further consideration relates to a list of permitted merchants.

3. The method of claim 2, wherein the at least one history-based rule relates to adding a merchant name that relates to the at least one previously-completed transaction to the list of permitted merchants.

4. The method of claim 1, wherein the at least one history-based rule is based on each of a location, a day of a week, and a time of the day at which the at least one transaction was previously completed.

5. The method of claim 1, wherein the at least one second entry relates to a spending limitation for a proposed purchase.

6. The method of claim 1, wherein the at least one second entry relates to a proposed purchase of merchandise that relates to at least one merchant category.

7. The method of claim 6, wherein the at least one merchant category includes at least one from among alcohol and a casino.

8. The method of claim 1, wherein the at least one second entry relates to a geographical restriction for a proposed purchase.

9. The method of claim 1, wherein the at least one second entry relates to a listing of disfavored merchants.

10. The method of claim 1, further comprising:
    displaying, on the display of the mobile communication device, a multi-factor authentication selection user interface that includes a plurality of selectable authentication types; and
    receiving, from the user, at least one selection from among the plurality of authentication types,
    wherein, when a proposed transaction is initiated, the method further includes performing an authentication of the user based on the received at least one selection.

11. The method of claim 1, further comprising displaying, on the display of the mobile communication device, a user prompt that relates to whether to approve or decline the transaction.

12. A portable device configured to implement an execution of a web application for automatically determining whether to disable a purchase card, the portable device comprising:
    a display screen;
    a processor;
    a memory; and
    a communication interface coupled to each of the processor, the memory, and the display screen,
    wherein, when the web application is being executed, the processor is configured to:
        display, on the display screen, a user interface that is generated by the web application and that includes a first prompt for facilitating a user selection of a purchase card and at least a second prompt for facilitating a user entry that relates to a rule for conducting a transaction with the selected purchase card;
        receive, from a user via the communication interface, user input that includes at least one first entry that relates to a criterion for permitting a transaction without further consideration and at least one second entry that relates to a preference for declining a transaction;
        access, from the memory, historical transaction information that relates to at least one transaction that has previously been completed;
        generate at least one history-based rule based on the accessed historical transaction information;
        receive, via the communication interface after the at least one first entry and the at least one second entry have been received and after the at least one history-based rule has been generated, information that relates to a proposed transaction;
        determine whether to recommend a preauthorization for the proposed transaction or to recommend a declination of the preauthorization, based on the at least one first entry, the at least one second entry, the at least one history-based rule, and the information that relates to the proposed transaction; and
        display, on the display screen, a recommendation message based on a result of the determining.

13. The portable device of claim 12, wherein the at least one criterion for permitting a transaction without further consideration relates to a list of permitted merchants.

14. The portable device of claim 13, wherein the at least one history-based rule relates to adding a merchant name that relates to the at least one previously-completed transaction to the list of permitted merchants.

15. The portable device of claim 12, wherein the at least one history-based rule is based on each of a location, a day of a week, and a time of the day at which the at least one transaction was previously completed.

16. The portable device of claim 12, wherein the at least one second entry relates to a spending limitation for a proposed purchase.

17. The portable device of claim 12, wherein the at least one second entry relates to a proposed purchase of merchandise that relates to at least one merchant category.

18. The portable device of claim 17, wherein the at least one merchant category includes at least one from among alcohol and a casino.

19. The portable device of claim 12, wherein the at least one second entry relates to a geographical restriction for a proposed purchase.

20. The portable device of claim 12, wherein the at least one second entry relates to a listing of disfavored merchants.

21. The portable device of claim 12, wherein the processor is further configured to:

display, on the display screen, a multi-factor authentication selection user interface that includes a plurality of selectable authentication types; and receive, from the user, at least one selection from among the plurality of authentication types, wherein, when a proposed transaction is initiated, the processor is further configured to perform an authentication of the user based on the received at least one selection.

22. The portable device of claim 12, wherein the processor is further configured to display, on the display screen, a user prompt that relates to whether to approve or decline the transaction.

* * * * *